United States Patent Office 3,072,028
Patented Jan. 8, 1963

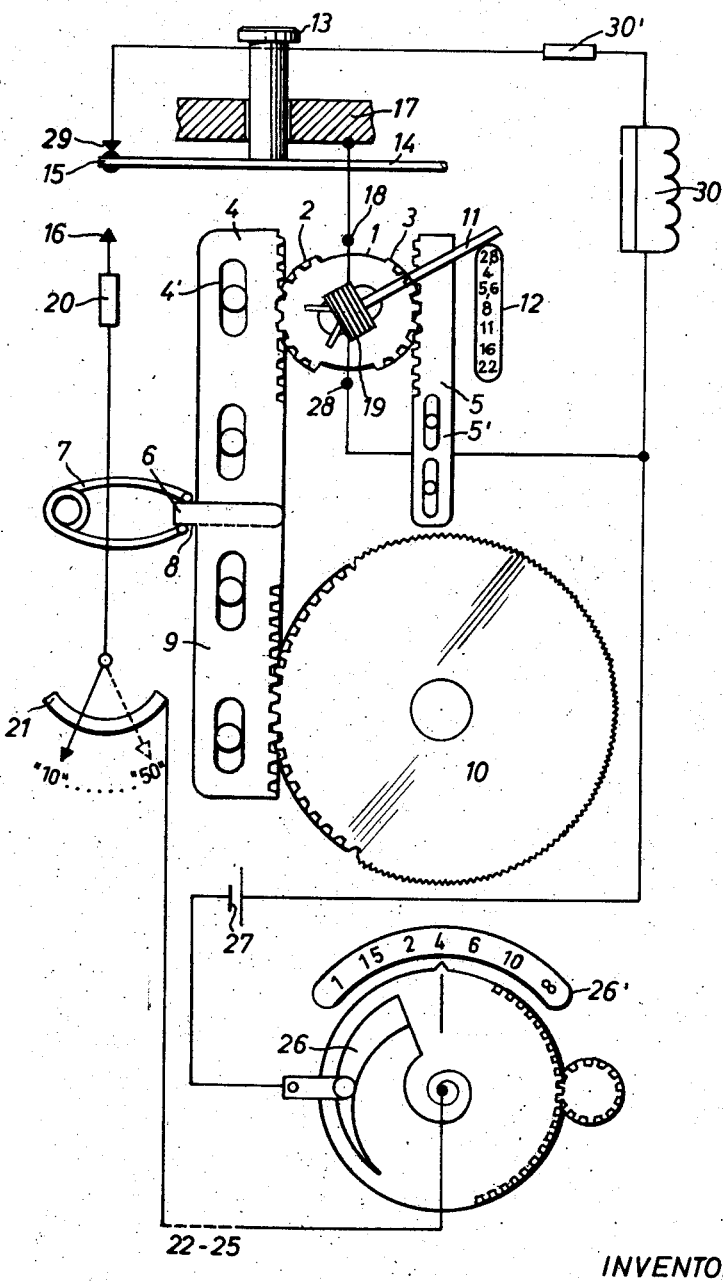

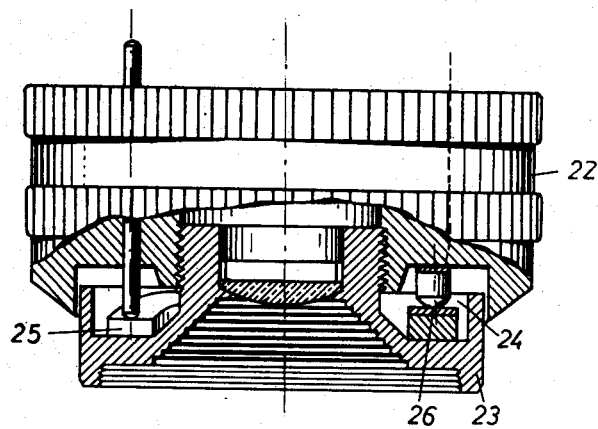
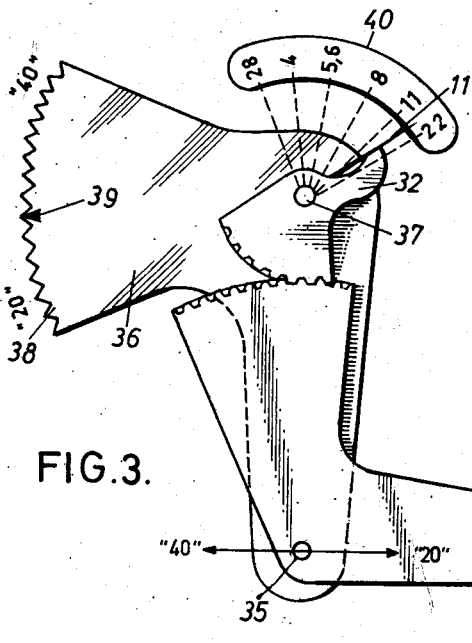
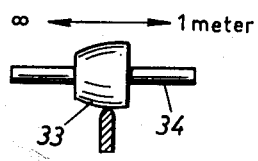
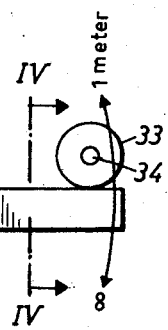

3,072,028
AUTOMATIC FLASHLIGHT AND DIAPHRAGM CONTROL DEVICE FOR PHOTOGRAPHIC CAMERAS
Karl Heinz Lange, Bunde-Ennigloh, Germany, assignor to Balda-Kamerawerk Rudolf Gruter, Kommanditgesellschaft, Bunde, Germany, a German company
Filed Sept. 6, 1960, Ser. No. 54,302
Claims priority, application Germany Sept. 9, 1959
5 Claims. (Cl. 95—10)

Various technical possibilities exist for bringing the diaphragm of a photographic centre shutter into fully automatic dependence on the prevailing light conditions and the adjusted shutter time and film sensitiivty. However, if flashlight photographs are to be taken with the camera, the dependence of the diaphragm on the shutter time, film sensitivity and brightness is of no value; the diaphragm will then, as is well known, be set according to the adjusted distance, since the brightness of the flash decreases with the square of the distance. The present invention concerns the possibility of using the devices already present in the camera for the fully automatic re-adjustment of the diaphragm in order to allow the aperture to be adjusted completely automatically not only dependently on the light conditions, but selectively also dependently on the adjusted distance of the camera. In these cases such constructions are principally concerned in which the indicator of the exposure meter instrument may become jammed in the course of the shutter release operation and scanning is subsequently effected by a scanning member which is driven by the shutter and in turn allows the diaphragm to move to the position which results from the scanned position. It is also assumed that the film sensitivity and the shutter time are taken into consideration by rotating the casing of the measuring instrument and the indicator of the measuring instrument moves over an aperture scale which is preferably visible in the view finder.

Solutions to the problem have been proposed which admit an optional connection between the diaphragm setting and the time setting (so-called light value setting) and the range adjustment on the other hand. In this connection a possibility is usually provided of changing the adjustment of the diaphragm relative to the range in order to adjust the coefficient of the flash apparatus employed. This last mentioned construction seems at first glance to require less expense. The proposed new method however, assumes the presence of a resilient diaphragm and exposure automatic device in a camera already, and compared with the simple mechanical coupling between time and diaphragm also allows the advantages of the already existing exposure automatic device, such as the visibility of the adjusted aperture in the view finder, to be utilised. Seen from this point of view, the expense of converting a camera having fully automatic readjustment of exposure value, time, sensitivity and aperture into one having fully automatic range and aperture coupling, is only small. The solution of the above-described problem may be achieved by mechanical and electrical means, whilst, according to the structural details of the camera construction, preference should be given to one of the two. In the description of the invention which now follows, substantially only the electrical method is described. It is however, possible without difficulty to derive a suitable mechanical solution therefrom.

The invention will now be described wtih reference to embodiments of control devices in accordance with the invention illustrated in the accompanying drawings wherein:

FIGURE 1 shows a very diagrammatic arrangement of the operating members essential to the invention, omitting the means which are assumed to be known and to cause the fully automatic adjustment of the diaphragm dependently on the position of the exposure meter indicator, FIGURE 2 is a cross section through the front lens focussing adjustment of a centre shutter of normal construction, FIGURE 3 is an embodiment of a form of gear unit to produce the mechanical coupling between the focussing adjustment and the exposure meter readjustment indicator and FIGURE 4 is a detail view on the line IV—IV of FIGURE 3.

Referring to FIGURE 1, the casing 1 of the exposure meter is provided with opposing toothed segments 2 and 3 which in turn mesh with the racks 4 and 5. The racks 4 and 5 may be arranged in slotted guides 4′, 5′ (as shown) or otherwise. The rack 4 in the embodiment has a cam 6 which is held in coincidence with a corresponding cam 8 of another rack 9 by a shank spring 7. The rack 9 extends partly underneath rack 4 and engages the ring 10. This arrangement of the bilaterally acting spring means formed by the cams 6 and 8 and the shank spring 7, permits independent turning of the exposure meter 1 relatively to the position of the rack 9 and the time, film sensitivity combination ring 10 of the centre shutter by overcoming the spring 7. If no other external forces which could overcome the spring 7 act on the exposure meter casing 1 or the racks 4 and 5, the exposure meter casing 1 follows every turn of the ring 10 and thus changes the position of the indicator 11 on the aperture scale 12. This dependence of the position of the exposure meter casing on the time and film sensitivity adjustment of the shutter is only required with the use of the automatic aperture adjusting means in daylight. With the use of flashlamps having relatively short flash duration compared with the shortest shutter time, the changing of the exposure time on the shutter has, however, no influence on the density of the film. For this reason, in the event of switching over to the aperture setting according to range, the exposure meter casing 1 is brought, by depressing the button 13, into a zero setting which ensures that the measuring instrument indicator 11 sweeps over the entire aperture range and is not prevented from doing so by indicator abutments in the exposure meter casing 1. In the present embodiment the zero setting of the measurement casing 1 is achieved by the fact that an arm 14, connected to the button 13, presses on one of the two racks 4 and 5 which is located at a higher or lower position according to the adjustment of the ring 10 and depresses the rack, overcoming the spring 7, until the other rising racks 5 or 4 also reaches the arm 14, and thus further depression of the button 13 is prevented. At the moment when the racks 4 and 5, moved by the arm 14, and consequently, also the exposure meter casing 1, are in their zero setting, the arm 14 acts through its other end 15, cn a contact 16, and thereby establishes a circuit which is connected through the arm 14, the button 13 and the spring-loaded guide 17 of the button 13 to one contact 18 of the measuring instrument 19. The circuit extends behind the contact 16, through the series resistance 20 of the potentiometer 21, then passes via the latter through a conductor, by way of the camera shutter 22 (FIGURE 2), into the space 24 behind the front lens holder 23 in which space a range finder control cam 25 is usually located. An essential feature of the invention is that, in the space not occupied by the range finder control cam 25, the sliding path of another potentiometer 26 can be accommodated. The circuit continues via this other potentiometer 26, the resistance of which changes in a predetermined manner dependently on the range adjustment, via the battery 27, to the other contact 28 of the measuring instrument 19. At the moment the button 13 is depressed, a resting contact 15, 29 is interrupted and usually allows the electromotive force produced by a photo-cell 30 to act on the exposure meter 1, 19 through the resistance 30' and thus allows the indicator 11 of the measuring instrument 19 to be moved dependently on the prevailing brightness conditions. In the illustration shown, the button 13 must be continuously depressed for the duration of the automatic aperture re-adjustment operation according to the range. It is, however, also possible of course, and probably even advisable, to secure the button in its two end positions by generally known means or to have it fixed by other means.

The mode of operation of the system according to FIGS. 1 and 2 is as follows:

If the apparatus is used for automatic aperture re-adjustment in daylight, an adjustment of the time and film sensitivity ring 10 is effected in a conventional manner, not explained in detail, by way of suitably coupled graduated rings. According to the brightness of the daylight, the indicator 11 is adjusted to the most favourable aperture number visible in the window 12 of the view finder. Upon actuation of the shutter (not shown) the position of the indicator 11 is ensured by a clamping device before the exposure takes place and scanned by a readjusting indicator which is coupled to the diaphragm which adjusts itself thereby automatically to the most favourable value shown by the indicator 11 in the view finder. If the photographer, however, wishes to change over to using the camera in conjunction with a flash apparatus, he merely presses the button 13 and for the time being breaks the contact 15, 29 and, consequently, the circuit which controls the exposure meter indicator 11 dependently on the daylight. Upon further depression of the button 13, the exposure meter casing 1 is turned, independently of the unchanged setting of the time and film sensitivity ring 10, to a zero setting by acting on the two racks 4 and 5, and thus the ring 10 is rendered inoperative. Moreover, in this position of the button 13, the battery 27 is connected to the measuring device by way of the contact 15, 16, via the potentiometers 21 and 26 and possibly another resistance 20. It should also be mentioned that whilst the flash coefficient potentiometer 21 may have linear control characteristics, the range potentiometer 26, fitted in the front lens holder 23, must have a characteristic which compensates the nonlinear increase of the range finder scale 26'. If a flash apparatus is now connected which, in view of the sensitivity of the film to be used, has a conductance coefficient "24," on the scale of potentiometer 21 for example, such a dependence is produced relative to the position of the range scale 26' and the measurement instrument indicator 11, by means of the potentiometer 21, that, for example, in the 6 m. position the measurement indicator 11 points to aperture 4 and, when the shutter release operation is started, imparts this value to the aperture in the shutter by means of the aperture readjustment gear mechanism (not shown). In the 1 m. position, the indicator 11 in this case would leave the scale area 12 and indicate to the photographer, in the manner traditional to daylight automatic adjustment, that a satisfactory exposure could not be achieved. If the flash apparatus is provided with reversible coefficient ranges, the photographer can then, by reducing the coefficient and reversing the potentiometer 21 accordingly, bring the indicator 11 back into the aperture scale range and thus take a correctly exposed photograph.

If the battery 27, which, due to the great sensitivity of the measuring instrument 19, need only be very small (a single button cell or the like may be used), has not sufficient voltage constancy to permit of calibration of the potentiometer 21 according to coefficient values, it is preferable to omit such values entirely, and to instruct the photographer to adjust only once a pairing of values which appears favourable to him, e.g. 3 m. aperture 8, with coefficient "24," after which all other aperture values will be automatically associated through the corresponding characteristic of the potentiometer 26.

If desired, a small size accumulator can be used instead of the battery 27, said accumulator being kept in a permanently charged condition by the photo electric cell 30, and with the button 13 in another control position.

Apart from this, it is also possible to eliminate electrical means and, instead to use a mechanical device.

Instead of the electrical devices as designated by the numerals 20 to 27 in FIG. 1, a mechanical gear mechanism is illustrated schematically in FIGURE 3, in which a lever 31 controls an indicator abutment 32 so that the latter indicates the most favourable aperture on the scale 40 by way of a cam 33 which can be connected to the range finder scanner 34 in the relationship also achieved by the potentiometer 26, and simultaneously adjusts the aperture either directly or by way of the already described scanning of the position of the indicator 11 driven by the abutment 32. Due to the fact that the lever 31 is rotatably riveted at its centre 35 of rotation to a rocker 36 which is pivotable about the axis 37 of the indicator abutment 32, the coefficient of the flash to be used can be very simply adjusted relatively to a mark 39 by means of a knurled part 38 of the rocker 36 projecting from the camera.

I claim:

1. In a photographic camera having a front lens, a rotatable front lens holder arranged for range setting, a shutter and a range finder, the combination with an automatic adjusting apparatus for flashlight exposures and a diaphragm device having an automatic aperture adjustment, of an exposure meter having a photo-electric cell, said exposure meter having a casing, an indicator and a scale for indicating the setting of said aperture for daylight exposures as well as for said flashlight exposures, said casing having a zero position, a readjustment indicator, means driving said readjustment indicator from said shutter of said camera, operative means connecting said indicator of said exposure meter with said readjustment indicator, the former being arrested by the operation of said shutter and being scanned by the latter, means transmitting the position of said readjustment indicator to said diaphragm, a time-and-film sensitivity gear mechanism on said shutter, means connecting said mechanism to said casing of said exposure meter, said mechanism being adjusted by a rotation of said casing, and mechanical means operative for said flashlight exposures, said mechanical means forcing said exposure meter casing into said zero position independent of a previous setting of said casing by said time-and-film sensitivity gear mechanism, said mechanical means simultaneously interrupting the circuit of said photo-electric cell and further providing means for adjusting said indicator of said exposure meter independent of its daylight setting but for both the flashlight coefficient and the range value, for indicating for said flashlight exposures the setting of said aperture corresponding to said range in the same manner as for said daylight exposures.

2. In a photographic camera having a front lens, a rotatable front lens holder arranged for range setting, a shutter and a range finder, the combination according to claim 1, said exposure meter casing having gear teeth on two opposite sides thereof, first racks engaging said gear teeth, said racks being movable in opposite directions, said time-and-film sensitivity gear mechanism on said shutter having a ring, said ring having gear teeth, a third rack in line partly overlapping one of said first racks, said third rack engaging said gear teeth of said ring, and a shank spring abutting against said third rack and against said one of said first racks overlapped by said third rack, and said mechanical means comprising a knob for switching said apparatus from daylight exposures to flashlight exposures, said knob forcing said first racks to rotate said exposure meter casing into said zero position, independently from previous settings of said third rack by said ring, by overcoming said shank spring pressure.

3. In a photographic camera having a front lens, a rotatable front lens holder arranged for range setting, a shutter and a range finder, the combination according to claim 2, and having further electrical means combined with said mechanical means operative for said flashlight exposures, said electrical means comprising a battery, a switch device combined with said knob for switching over from said circuit of said photo-electric cell to the circuit of said battery, a first adjustable potentiometer for said range setting and a second adjustable potentiometer for said flashlight coefficient.

4. In a photographic camera having a front lens, a rotatable front lens holder arranged for range setting, a shutter and a range finder, the combination according to claim 3, comprising means for disposing said first adjustable range setting potentiometer inside said rotatable front lens holder.

5. In a photographic camera having a front lens, a rotatable front lens holder arranged for range setting, a shutter and a range finder, the combination according to claim 4, comprising means for connecting said first adjustable range setting potentiometer with said range finder.

References Cited in the file of this patent

UNITED STATES PATENTS

| | | |
|---|---|---|
| 2,351,834 | Phillips | June 20, 1944 |
| 2,868,095 | Gebele | Jan. 13, 1959 |
| 2,913,969 | Faulhaber | Nov. 24, 1959 |
| 2,923,216 | Greger | Feb. 2, 1960 |